(12) United States Patent
Obermeyer et al.

(10) Patent No.: US 11,760,188 B2
(45) Date of Patent: Sep. 19, 2023

(54) WHEEL DRIVE MODULE FOR DRIVING AND STEERING A WHEEL

(71) Applicant: ebm-papst St. Georgen GmbH & Co. KG, St. Georgen (DE)

(72) Inventors: Friedrich Obermeyer, Forchheim (DE); Joerg Hornberger, Dornstetten-Aach (DE); Andreas Riedel, Roethenbach (DE); Richard Silberhorn, Wendelstein (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 349 days.

(21) Appl. No.: 16/973,481

(22) PCT Filed: May 16, 2019

(86) PCT No.: PCT/EP2019/062584
§ 371 (c)(1),
(2) Date: Dec. 9, 2020

(87) PCT Pub. No.: WO2019/242945
PCT Pub. Date: Dec. 26, 2019

(65) Prior Publication Data
US 2021/0237553 A1    Aug. 5, 2021

(30) Foreign Application Priority Data

Jun. 22, 2018 (DE) ..................... 10 2018 115 112.8

(51) Int. Cl.
*B60K 7/00* (2006.01)
*B60K 17/04* (2006.01)
*B62D 5/04* (2006.01)

(52) U.S. Cl.
CPC .......... *B60K 7/0007* (2013.01); *B60K 17/043* (2013.01); *B60K 2007/003* (2013.01); *B60K 2007/0046* (2013.01); *B62D 5/0418* (2013.01)

(58) Field of Classification Search
CPC ................. B60K 7/007; B60K 17/043; B60K 2007/003; B60K 2007/0046; B62D 5/0418
(Continued)

(56) References Cited

U.S. PATENT DOCUMENTS 6,491,127 B1 * 12/2002 Holmberg .............. B62D 7/026
301/6.5
7,296,643 B2 * 11/2007 Philipson ............. B60K 7/0007
180/21
(Continued)

FOREIGN PATENT DOCUMENTS

| CN | 102166951 A | 8/2011 |
|---|---|---|
| CN | 102892673 A | 1/2013 |

(Continued)

OTHER PUBLICATIONS

Chinese Office Action dated Jun. 23, 2022, which issued in the corresponding Chinese Patent Application No. 201980033811.2.
(Continued)

*Primary Examiner* — Hau V Phan
(74) *Attorney, Agent, or Firm* — Dickinson Wright PLLC

(57) ABSTRACT

A wheel drive module (1) is provided for driving and steering a wheel (30), comprising the wheel (30), a first drive motor (11), a second drive motor (21), and a transmission. The wheel (30) can be driven and steered simultaneously by the first drive motor (11) and the second drive motor (21) via the transmission, wherein a first motor shaft (12) for driving the transmission extends from the first drive motor (11) in a first motor shaft direction (12'), a second motor shaft (22) for driving the transmission extends from the second drive
(Continued)

motor (21) in a second motor shaft direction (22'), the first motor shaft direction (12') and the second motor shaft direction (22') are opposite each other, and the first drive motor (11) and the second drive motor (21) extend parallel to the first and second motor shaft directions (12', 22') over a common overlap section (Ü).

12 Claims, 3 Drawing Sheets

(58) Field of Classification Search
USPC .................................................. 180/65.51
See application file for complete search history.

(56) References Cited

U.S. PATENT DOCUMENTS

| | | | | |
|---|---|---|---|---|
| 8,348,002 | B2* | 1/2013 | Checketts | B62D 7/026 180/234 |
| 8,684,115 | B2* | 4/2014 | Bryant | B62D 15/00 180/6.5 |
| 8,950,520 | B2* | 2/2015 | Hauser | B62D 5/046 180/6.24 |
| 9,085,302 | B2* | 7/2015 | Borroni-Bird | B62D 5/0418 |
| 9,108,665 | B2* | 8/2015 | Amino | B62D 5/0418 |
| 9,821,835 | B2* | 11/2017 | Ferrer-Dalmau Nieto | B62D 5/26 |
| 2007/0199748 | A1* | 8/2007 | Ross | B60K 7/0007 180/65.51 |
| 2010/0181135 | A1* | 7/2010 | Sbarro | B62D 61/04 180/65.21 |
| 2011/0168474 | A1* | 7/2011 | Checketts | B62D 7/026 74/425 |
| 2013/0333966 | A1 | 12/2013 | Bryant | |

FOREIGN PATENT DOCUMENTS

| | | |
|---|---|---|
| DE | 202008004190 U1 | 6/2008 |
| DE | 102016007445 A1 | 12/2017 |

OTHER PUBLICATIONS

International Search Report dated Sep. 6, 2019, which issued in corresponding PCT Patent Application No. PCT/EP2019/062584, including Eng. translation.

* cited by examiner

WHEEL DRIVE MODULE FOR DRIVING AND STEERING A WHEEL

BACKGROUND

Field

The invention relates to a wheel drive module for driving and steering a wheel, wherein the wheel can be driven and at the same time steered by two drive motors.

Description of Related Art

In the prior art, a plurality of wheel drive modules and wheel drive designs for the different application fields are already known. If the wheel drive designs are to be bundled to form a single module, it is advantageous if said module is of compact design and consequently has only a small space requirement. In particular in the case of the use of such a wheel drive module for logistic applications, for example, in the case of transport carriages, a small design height is advantageous. In the designs disclosed in the prior art, a motor driving the wheel is often arranged with height offset with respect to the wheel and a transmission connected between the motor and the wheel. This results in the overall design height of the wheel drive module being determined by at least the sum of the design heights of the motor, of the wheel and partially of the transmission.

SUMMARY

The underlying aim of the invention therefore is to overcome the above-mentioned disadvantages and to provide a wheel drive module which has a small design height and which can be produced as a compact modular unit which can be produced cost-effectively.

This aim is achieved by the combination of features according to claim 1.

According to the invention, a wheel drive module for driving and steering a wheel is proposed. For this purpose, the wheel drive module comprises the wheel, a first drive motor, a second drive motor and a transmission. The wheel which is driven and steered by the wheel drive module is operatively connected to the transmission and can be driven and steered simultaneously via the first drive motor and the second drive motor, which act on the wheel via the transmission. A first motor shaft for driving the transmission, which can be rotated by the first drive motor and which drives the transmission, for example, via a first pinion, extends from the first drive motor in a first motor shaft direction. Analogously, a second motor shaft for driving the transmission, which can be rotated by the second drive motor and which drives the transmission, for example, via a second pinion, extends from the second drive motor in a second motor shaft direction. The first and the second drive motors are arranged opposite each other and thereby the first motor shaft direction and the second motor shaft direction are oriented or arranged opposite each other. Furthermore, the first drive motor and the second drive motor extend parallel to the first and second motor shaft directions over a common overlap section. The drive motors are consequently axis parallel and arranged next to one another, wherein the motor shafts associated with them point in opposite directions.

An embodiment of the invention, advantageous because it is particularly compact, provides that the overlap section is 50-90% of the total extent of the first drive motor and of the second drive motor parallel to the first and second motor shaft directions.

The drive motors moreover can comprise a motor transmission which can be arranged directly on the respective drive motor and from which the respective motor shaft extends. If a motor transmission is present, it forms, with the respective drive motor, a modular unit so that the entire extent of the respective drive motor is obtained from the sum of the extent of the motor itself and of the motor transmission associated with it.

In an advantageous development, the transmission comprises a first and a second driving gearwheel, which can be rotated independently of one another about a common rotation axis. Furthermore, the transmission comprises an output shaft which can be rotated about a wheel axis of the wheel and can be driven by the first and by the second driving gearwheels. The output shaft is connected to the wheel, and the wheel can be driven by the output shaft. By a first rotation of the first driving gearwheel and a second rotation of the second driving gearwheel about their common rotation axis, the output shaft with the wheel can be driven about the wheel axis and rotated about the rotation axis. The first motor shaft direction and the second motor shaft direction extend parallel to the rotation axis. The output shaft or the wheel axis about which the output shaft and the wheel can be rotated extends preferably orthogonally to the rotation axis of the first and second driving gearwheels.

The output shaft is preferably provided with a driven gearwheel which is arranged between the first driving gearwheel and the second driving gearwheel and which engages by means of its toothing in them or in the toothings of the driving gearwheels.

The first and the second driving gearwheels are preferably implemented as a toothed gear ring or sprocket. For the gearing with a pinion or an intermediate wheel, the sprockets preferably each comprise a first toothing, and for the transfer of the rotation to the driven gearwheel they comprise a second toothing preferably oriented orthogonally to the first toothing.

If the first driving gearwheel and the second driving gearwheel rotate with an identical rotational speed but in opposite directions about their common rotation axis, the output shaft is rotated via the driven gearwheel about the rotation axis without the position of the wheel about the rotation axis changing. If no position change of the output shaft or of the wheel with respect to the rotation axis of the driving gearwheels occurs, a driving of the wheel without a steering movement about the rotation axis of the driving gearwheels is implemented thereby. If there is a difference in the rotation of the driving gearwheels or the rotational speeds of the driving gearwheels, the wheel is at the same time driven and rotated about the rotation axis of the driving gearwheels, whereby a steering movement on the wheel is simultaneously implemented during the driving or advance. A rotation of the driving gearwheels with an identical rotational speed in an identical rotation direction leads to a steering movement, in which the wheel is locked or does not rotate about the wheel axis and is not driven.

An additional advantageous development variant provides that the first driving gearwheel of the transmission can be driven by a first driving gearwheel pairing of the first motor shaft, and furthermore the second driving gearwheel of the transmission can be driven by a second driving gearwheel pairing of the second motor shaft. The first driving gearwheel pairing is spaced from the second driving gearwheel pairing along the rotation axis by an offset. The offset is advantageously defined by the distance between the first and the second driving gearwheels and the driven gearwheel located between the driving gearwheels.

In an embodiment alternative, it is provided that the first motor shaft comprises a first pinion. Either the first pinion engages in the first driving gearwheel and with it forms the first driving gearwheel pairing, or the first pinion engages in a first intermediate wheel of the transmission. If a first intermediate gear is used, it is arranged between the first pinion and the first driving gearwheel, it engages by means of its toothing in them and with them or with the first driving gearwheel it forms the first driving gearwheel pairing.

Furthermore, it is analogously provided that the second motor shaft comprises a second pinion. Either the second pinion correspondingly engages in the second driving gearwheel and with it forms the second driving gearwheel pairing, or the second pinion engages in a second intermediate wheel of the transmission. If a second intermediate wheel is used, it is arranged between the second pinion and the second driving gearwheel, it engages by means of its toothing in them and with them or with the second driving gearwheel it forms the second driving gearwheel pairing.

By the respective intermediate wheel designed as gearwheel, a gear ratio between the respective motor shaft or the respective pinion and the respective driving gearwheel is determined. Here, the gear ratio can also be 1, so that the intermediate wheel is only used for the force and rotation transmission from the pinion to the driving gearwheel in the case of synchronous spacing of the pinion from the driving gearwheel.

In an advantageous embodiment of the invention, the overlap section of the first drive motor and of the second drive motor is arranged between the first and the second driving gearwheel pairings. Via the driven gearwheel, the driving gearwheels are necessarily spaced apart from one another, wherein, as a result of the arrangement of the overlap section between the first and the second driving gearwheel pairings, the gap existing between the driving gearwheel pairings for the integration of the first and second drive motors is used in order to constitute the compact design.

In an additional variant of the wheel drive module, the first drive motor and the second drive motor are arranged entirely between the first and second driving gearwheel pairings. Here, the respective motor shaft extends out of the respective drive motor and out of the gap between the driving gearwheel pairings.

In a development of the invention, it is furthermore advantageous that the first drive motor and/or the second drive motor have/has, parallel to the rotation axis, a linear dimension which is equal to or less than the offset between the first driving gearwheel pairing and the second driving gearwheel pairing.

In an additional embodiment variant, the first and the second motor shafts of the respective drive motor are arranged mutually offset in circumferential direction with respect to the rotation axis of the first and the second driving gearwheels.

Additionally or alternatively, the first motor shaft and the second motor shaft can be mutually offset with respect to the rotation axis of the first and second driving gearwheels in a radial direction of the driving gearwheels. The motor shafts and the respective associated drive motors can thereby be arranged, for example, with a respective axis of symmetry on a straight line starting from the rotation axis, resulting in a particularly small design of the wheel drive module in a top view in direction of rotation.

In another advantageous embodiment variant of the wheel drive module, the first and the second drive motors are arranged adjacent to one another in a circumferential direction of the rotation axis.

BRIEF DESCRIPTION OF THE DRAWINGS

Other advantageous developments of the invention are characterized in the dependent claims or are represented below in further detail with the description of the preferred embodiment of the invention in reference to the figures. The figures show:

The figures are diagrammatic examples. Identical reference numerals in the figures denote functionally and/or structurally identical features.

DETAILED DESCRIPTION OF ILLUSTRATIVE EMBODIMENTS

Figure 1:
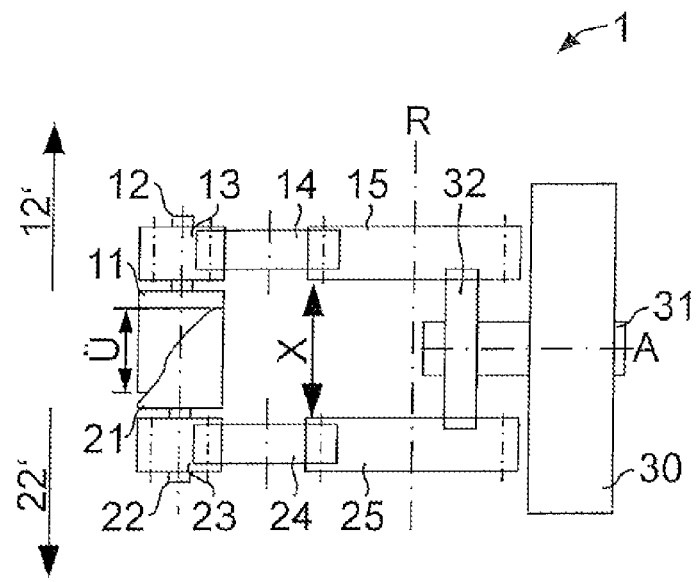
FIG. 1 a first wheel drive module in a side view.

In FIG. 1, an embodiment variant of the wheel drive module 1 according to the invention is represented. A first drive motor 11 and a second drive motor 21 are partially represented overlapping one another in the side view, wherein the second drive motor 21 is shown so that the first drive motor 11 behind it can be clearly seen. In each case a motor shaft 12, 22 extends from the drive motors 11, 21, wherein a first pinion 13 is arranged on the first motor shaft 12, and a second pinion 23 is arranged on the second motor shaft 22. The first pinion 13 engages in a first intermediate wheel 14, and the first intermediate wheel 14 engages in the first driving gearwheel 15, whereby the first drive motor 11 drives the first driving gearwheel 15 in rotation about the rotation axis R via a rotation of the first motor shaft 12. Analogously, the second pinion 23 engages in a second intermediate wheel 24 which engages in the second driving gearwheel 25, so that, by means of the second drive motor 21, via a rotation of the second motor shaft 22, the second driving gearwheel 25 can be driven in rotation about the rotation axis R.

The first and the second driving gearwheels 15, 25 are rotatably mounted about their common rotation axis R. The first and the second intermediate wheels 14, 24 rotate about a respective individual rotation axis, as represented superposed in FIG. 2, but they can also be offset with respect to one another in radial direction RA or circumferential direction UM of the driving gearwheels 15, 25.

By means of a driven gearwheel 32, arranged between the first and the second driving gearwheels 15, 25, and which is fastened to an output shaft 31, an offset X between the first and second driving gearwheels 15, 25 is defined. The first and the second drive motors 11, 21 are arranged at least sectionally between the driving gearwheels 15, 25, whereby they extend at least partially along the offset X. In the represented embodiment example of FIG. 1, the first and the second drive motors 11, 21 are arranged entirely within the offset X, whereby the design height of the drive unit 1 measured along the rotation axis is determined from the offset X and the respective thickness of the gearwheels, in particular of the driving gearwheels 15, 25 along the rotation axis R. The overlap section U by which the first and the second drive motors 11, 21, seen from the side in the depicted embodiment, overlap by approximately 85%, in the depicted embodiment of FIG. 1 lies entirely within the offset X. For driving the first or second driving gearwheel 15, 25, the first and second motor shafts 12, 22 point in mutually opposite directions. The first motor shaft direction 12' and the second motor shaft direction 22' are accordingly opposite from one another but parallel to one another and to the rotation axis R.

Figure 2:
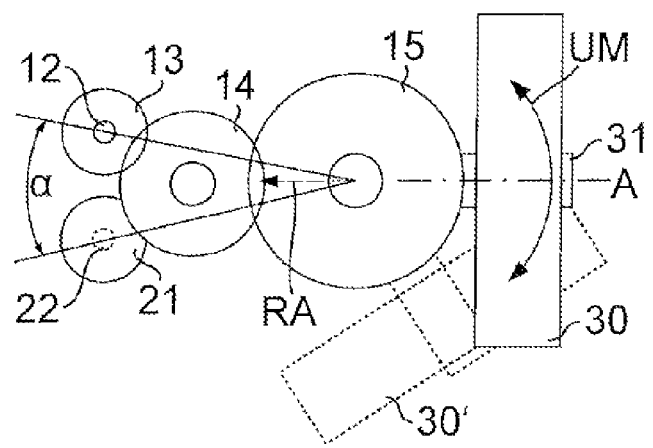
FIG. 2 a second wheel drive module in a top view.

FIG. 2 shows a wheel drive module 1 in the top view, wherein the first driving gearwheel 15 and the second driving gearwheel 25 overlap in the representation. In the represented embodiment example, the first intermediate wheel 14 and the second intermediate wheel 24 also overlap in the top view, wherein said intermediate wheels in an alternative embodiment can also be spaced apart in circumferential direction UM about the rotation axis R. The first motor shaft 12 with the first pinion 13 attached thereto is offset from the second motor shaft 22 with the second pinion 23 by the angle α in circumferential direction UM about the rotation axis R, whereby they are arranged next to one another. The first drive motor 11, in the diagrammatic representation in the top view, is arranged under the first pinion 13, and the second pinion 23 with the motor shaft 22 is arranged under the second drive motor 21, wherein the first drive motor 11 and the second drive motor 21 can also be designed to have a greater respective diameter than the respective pinion 13, 23 and can be arranged directly adjacently. In the embodiment variant as shown in FIG. 2, the first drive motor 11 and the second motor drive motor 21 are spaced equally far from the rotation axis R in radial direction RA. However, it is also possible alternatively to arrange the drive motors 11, 21 with a different distance from the rotation axis R. For example, the drive motors can be arranged so that they are offset independently of one another about the respective rotation axis of the respective intermediate wheel 14, 24.

In addition, to better illustrate the steering process, in FIG. 2, the wheel 30 is represented in a starting position and in a position shifted in circumferential direction UM about the rotation axis R. The deflected wheel 30' is here represented with dotted lines.

Figure 3:
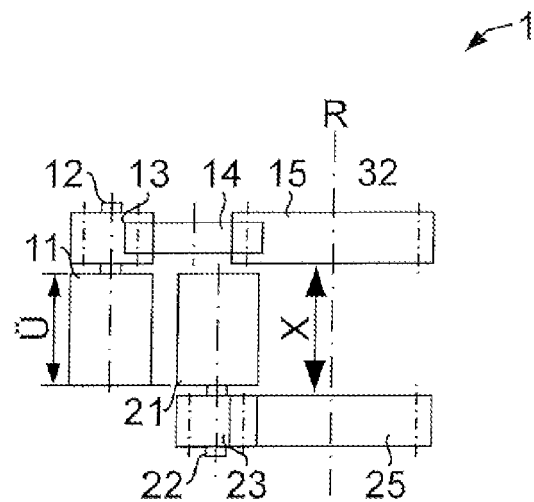
FIG. 3 a third wheel drive module in a side view.

The wheel drive module 1 shown in FIG. 3 is represented without the driven gearwheel 32, the output shaft 31 and the wheel 30 and is implemented without a second intermediate wheel 24. Due to the omission of the second intermediate wheel 24, the second pinion 23 engages directly in the second driving gearwheel 25 and drives it. The second drive motor 21 thereby moves closer in radial direction of the driving gearwheels 15, 25 to said driving gearwheels. The first and the second drive motors 11, 21 moreover can also be arranged adjacently to one another in radial direction RA. The gear ratio between the first pinion 13 and the first intermediate wheel 14 is preferably 1:1, wherein the second pinion 23 drives the second driving gearwheel 25 and the first pinion 13 drives the first driving gearwheel 15 via the first intermediate wheel 14 with the same gear ratio.

Figure 4:
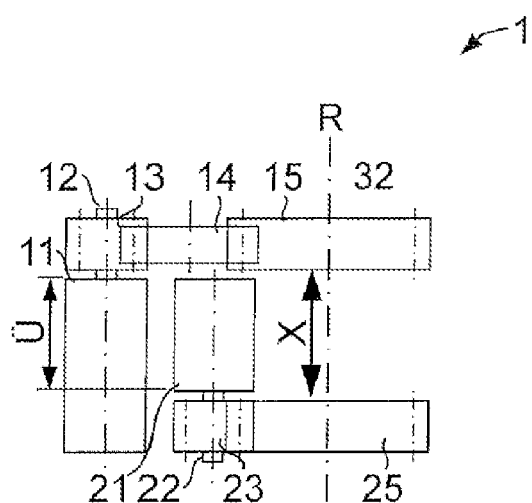
FIG. 4 a fourth wheel drive module in a side view.

The embodiment as represented in FIG. 4 corresponds substantially to the embodiment variant of FIG. 3, wherein the first drive motor 11 extends beyond the offset X and is arranged sectionally parallel to the second driving gear wheel 25, wherein the first drive motor does not extend along the rotation axis R beyond the driving gearwheel 25. If the first or the second drive motor 11, 21, in a top view, is not overlapped by the respective other intermediate wheel 14, 24 or the respective other driving gearwheel 15, 25, the respective drive motor 11, 21 can protrude beyond the offset X, wherein it still extends within the offset X over the overlap U parallel to the other drive motor 11, 21.

Figure 5:
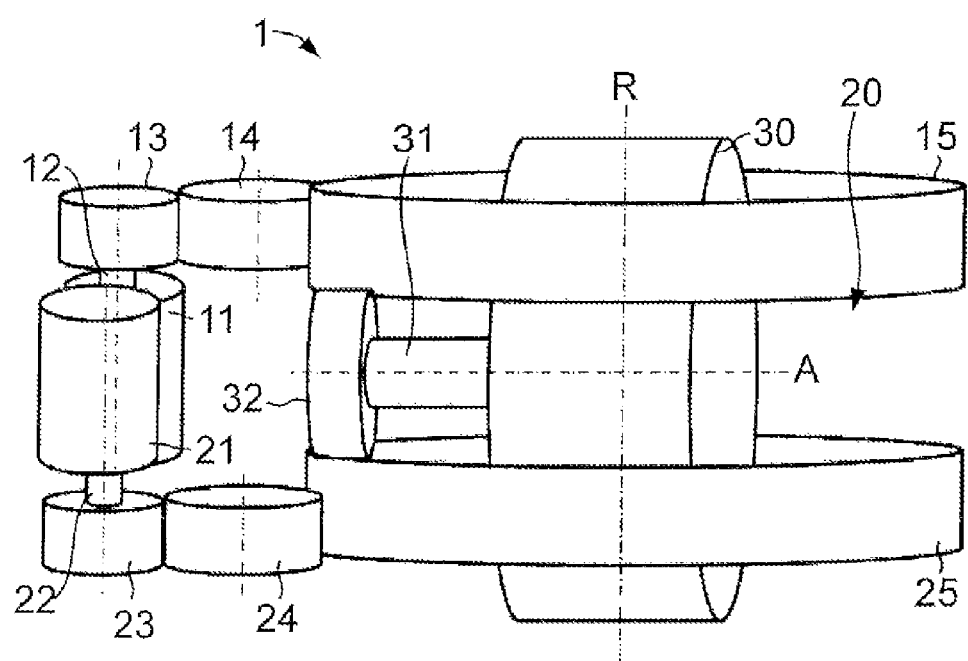
FIG. 5 a perspective representation of a wheel drive module.

The perspective and diagrammatic representation of the embodiment of the wheel drive module 1 of FIG. 5 is a variant in which the wheel 30 is arranged not outside the first and second driving gearwheels 15, 25 but rather within a wheel accommodation space 20 defined by the driving gearwheels 15, 25. The driving gearwheels 15, 25 are each implemented as a gear ring or a crown gear which is designed in the shape of a ring and comprises a toothing pointing toward the driven gearwheel 32 and a toothing pointing toward the respective intermediate wheel 14, 24. In particular, in the perspective representation, the arrangement of the first and second drive motors 11, 21 with respect to one another can be seen. They are arranged directly adjacently to one another and in a side view overlappingly in their longitudinal direction along the rotation axis R. At the same time, the drive motors 11, 21 with their respective motor shaft 12, 22 and the respective pinion 13, 23 have a common longitudinal extent along the rotation axis R, which, as a result of the overlap of the drive motors 11, 21, in total sum is equal to or less than the spacing of the sides of the first and second driving gearwheels 15, 25 facing away from one another along the rotation axis R.

The invention claimed is:

1. A wheel drive module (1) for driving and steering a wheel (30), comprising the wheel (30), a first drive motor (11), a second drive motor (21), and a transmission, wherein
the wheel (30) can be driven and steered simultaneously by the first drive motor (11) and the second drive motor (21) via the transmission, wherein
a first motor shaft (12) for driving the transmission extends from the first drive motor (11) in a first motor shaft direction (12'),
a second motor shaft (22) for driving the transmission extends from the second drive motor (21) in a second motor shaft direction (22'),
the first motor shaft direction (12') and the second motor shaft direction (22') are opposite each other, and
the first drive motor (11) and the second drive motor (21) extend parallel to the first and second motor shaft directions (12', 22') over a common overlap section (Ü),
wherein the transmission comprises a first and a second driving, gearwheel (15, 25) which can be rotated about a common rotation axis (R), as well as an output shaft (31) which can be rotated about a wheel axis (A) and which can be driven by the first and the second driving gearwheels (15, 25),
wherein the output shaft (31) is connected to the wheel (30) and the wheel (30) can be driven by the output shaft (31),
the output shaft (31) with the wheel (30) can be rotated by a first rotation of the first driving gearwheel (15) and a second rotation of the second driving gearwheel (25) about their common rotation axis (R) and can be driven about the wheel axis (A), and
the first motor shaft direction (12') and the second motor shaft direction (22') extend parallel to the rotation axis (R).

2. The wheel drive module according to claim 1, wherein the overlap section (Ü) is 50-80% of the respective entire extent of the first drive motor (11) and of the second drive motor (21) parallel to the first and to the second motor shaft directions (12', 22').

3. The wheel drive module according to claim 1, wherein the output shaft (31) is provided with a driven gearwheel (32) which is arranged between the first driving gearwheel (15) and the second driving gearwheel (25) and engages therein.

4. The wheel drive module according to claim 1, wherein the first driving gearwheel (15) of the transmission can be driven by a first driving gearwheel pairing of the first motor shaft (12), the second driving gearwheel (25) of the transmission can be driven by a second driving gearwheel pairing of the second motor shaft (22), and the first driving gearwheel pairing is spaced from the second driving gearwheel pairing along the rotation axis (R) by an offset (X).

5. The wheel drive module according to claim 4, wherein the first motor shaft (12) comprises a first pinion (13) which engages in the first driving gearwheel (15) and with it forms the first driving gearwheel pairing, or the first motor shaft (12) comprises a first pinion (13) which engages in a first intermediate wheel (14) which engages in the first driving gearwheel (15) and with it forms the first driving gearwheel pairing.

6. The wheel drive module according to claim 4, wherein the second motor shaft (22) comprises a second pinion (23) which engages in the second driving gearwheel (25) and with it forms the second driving gearwheel pairing, or the second motor shaft (22) comprises a second pinion (23) which engages in a second intermediate wheel (24) which engages in the second driving gearwheel (25) and with it forms the second driving gearwheel pairing.

7. The wheel drive module according to claim 4, wherein the overlap section (Ü) of the first drive motor (11) and the second drive motor (21) is arranged between the first and the second driving gearwheel pairings.

8. The wheel drive module according to claim 4, wherein the first drive motor (11) and the second drive motor (21) are arranged entirely between the first and the second driving gearwheel pairings.

9. The wheel drive module according to claim 4, wherein the first drive motor (11) and/or the second drive motor (21) have/has, parallel to the rotation axis (R), a linear dimension which is equal to or less than the offset (X) between the first driving gearwheel pairing and the second driving gearwheel pairing.

10. The wheel drive module according to claim 1, wherein the motor shafts (12, 22) of the drive motors (11, 21) are arranged offset in circumferential direction (UM) with respect to the rotation axis (R) of the driving gearwheels (15, 25).

11. The wheel drive module according to claim 1, wherein the first motor shaft (12) and the second motor shaft (22) are mutually offset with respect to the rotation axis (R) of the driving gearwheels (15, 25) in a radial direction (RA) of the driving gearwheels (15, 25).

12. The drive wheel module according to claim 1, wherein the first and the second drive motors (11, 21) are arranged adjacent to one another in a circumferential direction (UM) of the rotation axis (R).

\* \* \* \* \*